(12) United States Patent
Walesa et al.

(10) Patent No.: US 9,056,680 B2
(45) Date of Patent: Jun. 16, 2015

(54) CARGO PLANE LIGHTING SYSTEM

(76) Inventors: Phillip Walesa, Lomira, WI (US); Kevin McDermott, Lomira, WI (US)

( * ) Notice: Subject to any disclaimer, the term of this patent is extended or adjusted under 35 U.S.C. 154(b) by 639 days.

(21) Appl. No.: 12/959,643

(22) Filed: Dec. 3, 2010

(65) Prior Publication Data
US 2012/0140497 A1 Jun. 7, 2012

(51) Int. Cl.
*B64D 47/02* (2006.01)
*B64D 11/00* (2006.01)

(52) U.S. Cl.
CPC .......... *B64D 11/00* (2013.01); *Y10T 29/49002* (2015.01); *B64D 2011/0038* (2013.01)

(58) Field of Classification Search
CPC .......... B64D 11/00; B64D 2011/0038; Y10T 29/49002
USPC .......... 362/470, 471, 472, 484, 488, 478, 479
See application file for complete search history.

(56) References Cited

U.S. PATENT DOCUMENTS

| | | | |
|---|---|---|---|
| 2,229,203 A * | 1/1941 | Blomberg et al. | 362/480 |
| 5,677,603 A | 10/1997 | Speors | |
| 6,152,586 A | 11/2000 | Dealey, Jr. | |
| 6,422,723 B1 | 7/2002 | Walters | |
| 7,329,022 B2 * | 2/2008 | Tran et al. | 362/147 |
| 7,510,309 B1 | 3/2009 | Rizzo | |
| 2005/0128751 A1* | 6/2005 | Roberge et al. | 362/276 |

OTHER PUBLICATIONS

U.S. Appl. No. 12/261,216, filed May 6, 2010, Eckel, David P.

* cited by examiner

*Primary Examiner* — Anh Mai
*Assistant Examiner* — Jessica M Apenteng
(74) *Attorney, Agent, or Firm* — Absolute Technology Law Group, LLC

(57) ABSTRACT

The present invention is a cargo lighting system with a plurality of light heads mounted to a support bar. The support bar is divided into a plurality of interlocking segments and supported by stringer engaging components and supplemental support members. The cargo lighting system includes a master control box which allows light heads to be controlled by a master switch or with individual zone controls. The cargo lighting system is easily disassembled and packed in protective cases for transport and storage.

20 Claims, 11 Drawing Sheets

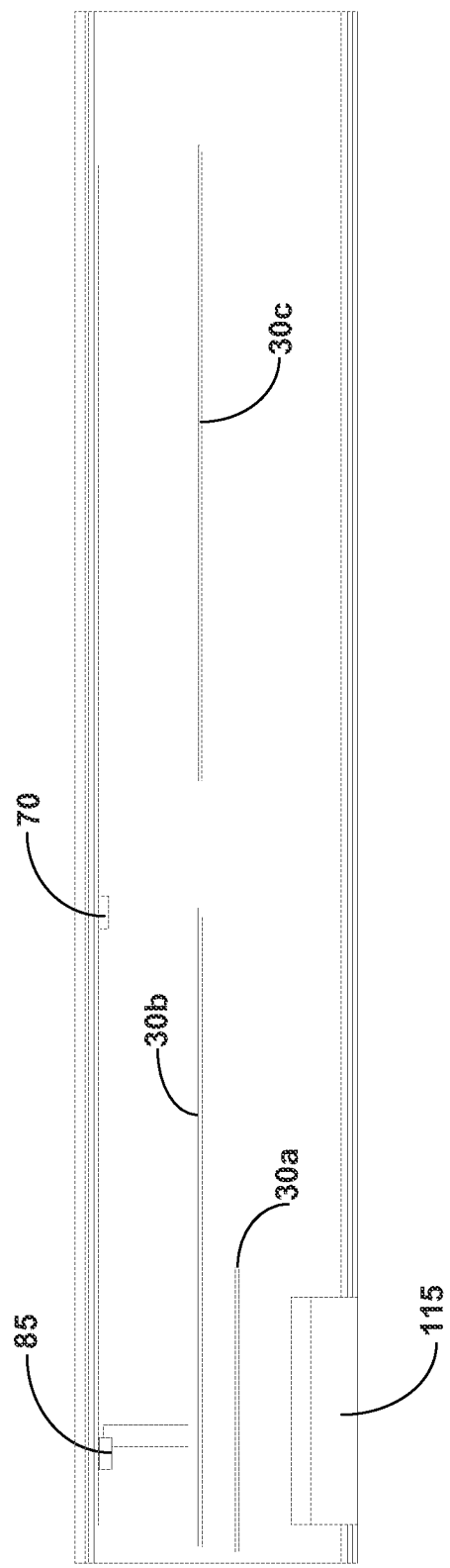

CARGO PLANE LIGHTING SYSTEM

FIELD OF INVENTION

The present invention relates to the field of lighting systems and more specifically to portable lighting systems.

BRIEF DESCRIPTION OF THE DRAWINGS

FIG. 5 illustrates a schematic of where elements of an exemplary cargo plane lighting system may be mounted.

GLOSSARY

Figure 1:
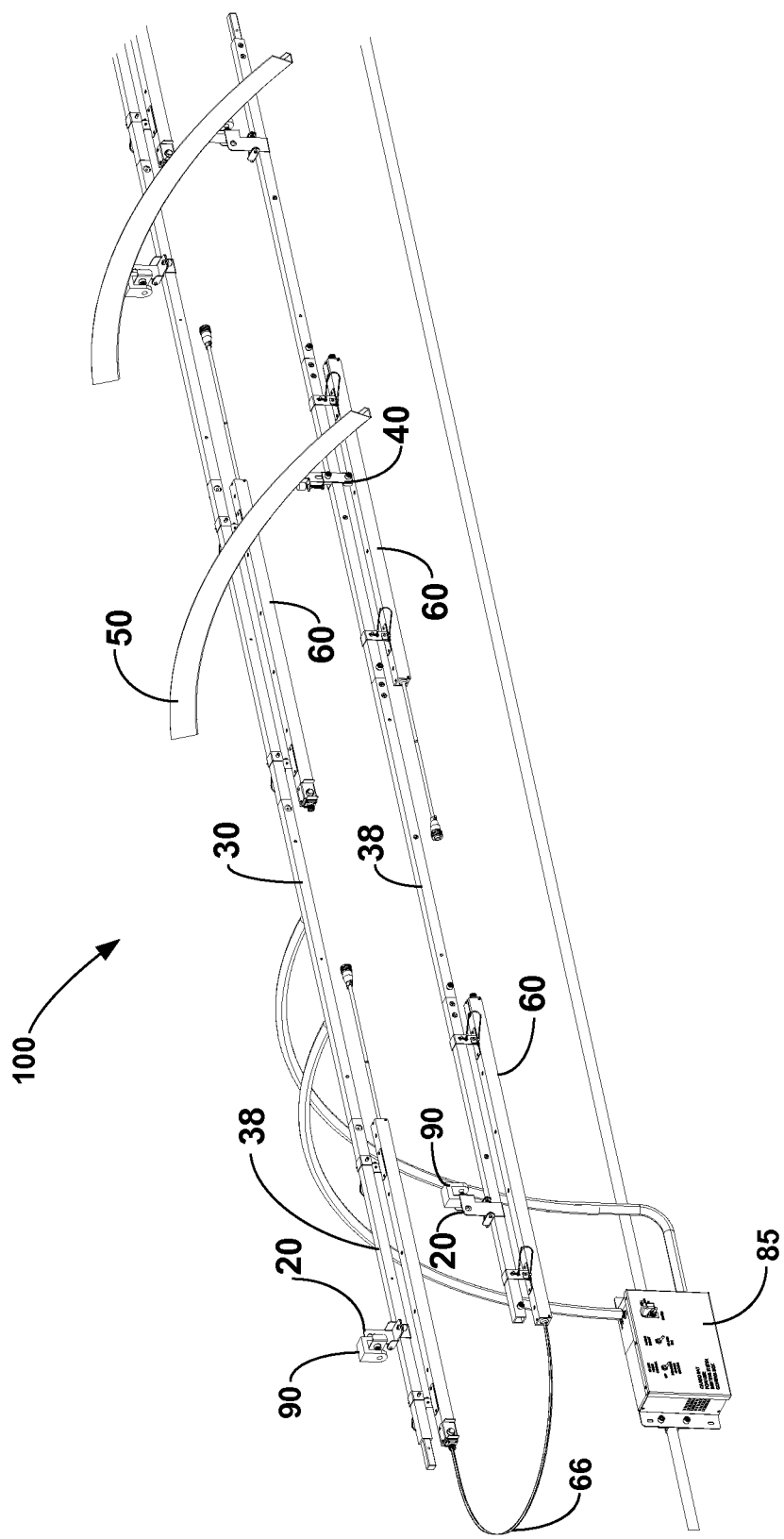
FIG. 1 illustrates an exemplary embodiment of a cargo plane lighting system in use in a cargo aircraft.

As used herein, the term "bolt assembly" refers to a bolt adapted to wind through an aperture to provide clamping force.

As used herein, the term "brace and pin assembly" refers to an attachment structure comprised of a securing component with at least one aperture that is secured by a pin that protrudes through the aperture.

As used herein, the term "bulkhead" refers to a transverse dividing partition or reinforcing frame in the cabin or cargo areas of an airplane.

As used herein, the term "bulkhead engaging member" refers to a component specially contoured and adapted to engage a bulkhead eye bracket on KC 135 plane.

As used herein, the term "cargo plane" or "cargo aircraft" means an aircraft designed for transport of cargo rather than commuter passengers.

As used herein, the term "clamping force" refers to force generated by one component being pressed or tightened against another.

As used herein, the term "deformable material" refers to a material that may be reversibly or permanently deformed through unequal pressure application. Pressure may be physically applied, such as with a bolt assembly, or indirectly applied, such as pressure caused from changes in temperature.

As used herein, the term "interlocking segments" means segments that releasably join through any means known in the art to create larger members.

As used herein, the term "LED" means any light emitting diode known in the art or functionally equivalent light emitting component, including but limited to incandescent, halogen, fluorescent, high intensity discharge or any other mechanical or chemical lighting component.

As used herein, the term "light head bracket" refers to a structure adapted to mount a light head to a support bar.

As used herein, the term "linearly arranged" means arranged in a line over a given distance. Linearly arranged objects may be offset or occur in groups, as long as the arrangement is primarily linear.

As used herein, the term "potentiometer" means a device with a position transducer used to control a bilateral triode thyristor to indirectly control bulb brightness.

As used herein, the term "selectively attached" means able to be attached or unattached as desired.

As used herein, the term "slotted height-adjusting member" refers to any two-component assembly, where a first component contains at least one elongated aperture and a second component contains at least one protuberance that protrudes through the aperture of the first component so that the second component may slide along the first component.

As used herein, the term "stringer" refers to a thin frame member of an aircraft used to support the skin and prevent deforming.

As used herein, the term "stringer affixation member" refers to a portion of a stringer engaging component that directly affixes to a stringer.

As used herein, the term "stringer engaging component" refers to a clamp adapted to engage a stringer without structurally altering a stringer.

As used herein, the term "stringer protective pad" refers to a pad on a stringer engaging component adapted to protect a stringer from damage caused by a stringer engaging component engaging a stringer.

As used herein, the term "support bar" means any component of any size, shape segmentation or construction used to support another component.

As used herein, the term "supplemental support member" refers to a brace which may be u-shaped, c-shaped, curved, angled or otherwise adapted to provide support when used in conjunction with a stringer engaging component. A supplemental support member may include, but is not limited to, a bulkhead engaging member.

As used herein, the term "vertical stringer suspension member" refers to a component of a stringer engaging component adapted to vertically suspend a component from a stringer engaging component.

BACKGROUND

KC-135s and other cargo planes are used by the military and other government agencies for aeromedical evacuation missions to remove injured and sick soldiers from the field, as well as transport cargo. Cargo aircrafts are also ubiquitous in the private sector.

Many activities may be conducted on board cargo planes, including medical procedures and preparation for critical missions.

However, the existing lighting systems of most cargo planes provide minimal task lighting. For example, the commonly deployed KC-135 used by the U.S. military has only 1 foot-candle of lighting at the floor and cover only a fraction of the cargo bay, making conducting on-board medical procedures, or even simple medical examinations, risky and sometimes impossible.

In order to overcome the inadequate lighting, flight and medical staff, and sometimes other passengers, hold spotlights to facilitate medical monitoring of patients. Sometimes emergency medical procedures would need to be completed during transport, in which case flight and medical staff would need to stably hold spotlights at precise angles, which was sometimes complicated by turbulent flights. In other cases, medical staff would wear helmet lights or similar structures around their head to provide light to examine a patient.

Other attempts to overcome the inadequate lighting in the cargo area of cargo aircrafts have also had problems. For example, one solution known in the art is to add dome lights to the interior of the cargo bay. However, these light do not provide the distribution or intensity required in many instances, especially in the case of on-board medical examinations. Current lighting standards require a color rendering index (CRI) of 80-85 for portable patient examination. A CRI of 100 is standard for operating rooms. Additional dome lights and other attempts to add lighting have not been successful in achieving the light intensity and color rendering index required.

A lighting system for cargo aircrafts must also be completely removable and require no modification to existing aircrafts. Some solutions known in the art require holes to be punched in existing aircraft structures. Modifying an aircraft structure in any way, however, risks compromising the structural integrity of the aircraft. There are also standardization requirements, particularly for government aircrafts, that mandate each aircraft be identical for maintenance and other reasons. Any modifications to the structure of an aircraft would therefore need to be identically done on all aircrafts.

Modification of the structure of a cargo aircraft also requires years of costly engineering studies in order to determine where structural modifications may be located, what size or type of modifications would not compromise the structural integrity of the aircraft, and whether such modifications may result in consequential deterioration of the aircraft. To perform and implement such a study also results in years of delay.

A lighting system for cargo aircrafts should also be portable. The government and many private companies have many cargo aircrafts. A portable unit may be transferred from one aircraft to another and used where needed. Fewer total lighting units means lower total costs for companies or agencies looking to invest in cargo aircraft lighting systems. Portable systems may also be removed from aircrafts for maintenance, upgrades or testing, meaning the aircraft is not grounded for the time it takes to complete maintenance, upgrades or testing. Permanently installed cargo aircraft lighting systems are more costly because they must be installed in every aircraft, and aircrafts must be left unused while maintenance is performed on the lighting system.

Existing attempts at lighting for cargo aircrafts provide only a single intensity of lighting. However, lighting needs throughout an aircraft may not be continuous, especially when a cargo plane is being used for an aeromedical mission. For example, when transporting medical patients, some patients may need rest, and dimmed lights, while others may need medical attention and full lighting. In other situations, when a cargo aircraft is transporting goods, it may not be necessary to having intense lighting throughout the cargo area, but rather only in specific areas when loading, unloading or securing cargo.

The lighting system must also be adapted to survive in the climates and conditions experienced by cargo aircrafts. For example, cargo aircrafts may sit on a runway overnight during an Alaskan winter and later sit on a runway along the equator. Compartment temperatures of cargo aircrafts can range from below freezing to over 100° F. Lighting systems must also be able to withstand turbulent travel. If used by government agencies and the military, a lighting system must also be explosion proof, resistant to vibration and approved by the Air Force for in-flight use.

It is desirable to have a portable lighting system that provides sufficient intensity light to facilitate in-flight medical examinations and procedures.

It is desirable to have a portable lighting system adapted to mount in an aircraft using existing structures for support and remove and transport easily.

It is further desirable to have a portable lighting system that may be zoned and controlled by both zone controls and a master control.

It is further desirable to have a portable lighting system that is stable during flights and may include optional mounting support members to increase the stability of the lighting system as needed.

It is further desirable to have a portable cargo plane lighting system easily adapted to install in a variety of planes.

SUMMARY OF THE INVENTION

The present invention is a cargo lighting system with a plurality of light emitting components mounted in light heads and releasably attached to a support bar by light head brackets. A stringer engaging component securely suspends support bar from aircraft stringers.

DETAILED DESCRIPTION OF INVENTION

For the purpose of promoting an understanding of the present invention, references are made in the text to exemplary embodiments of a portable lighting system, only some of which are described herein. It should be understood that no limitations on the scope of the invention are intended by describing these exemplary embodiments. One of ordinary skill in the art will readily appreciate that alternate but functionally equivalent materials and structures may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an exemplary embodiment of cargo plane lighting system 100. Stringer engaging component 40 releasably attaches to stringer 50 to provide support for support bar 30. Supplemental support members 20 attach to pre-existing structures of the cargo area of an aircraft, such as bulkhead "eye" brackets 90 as shown in the exemplary embodiment in FIG. 1, and aid in securing support bar 30.

Support bar 30 is created from a plurality of interlocking segments 38. Light heads 60 are attached to support bar 30. Light heads 60 are connected by serial cable component 66. Master control box 85 controls light heads 60.

Figure 2A:
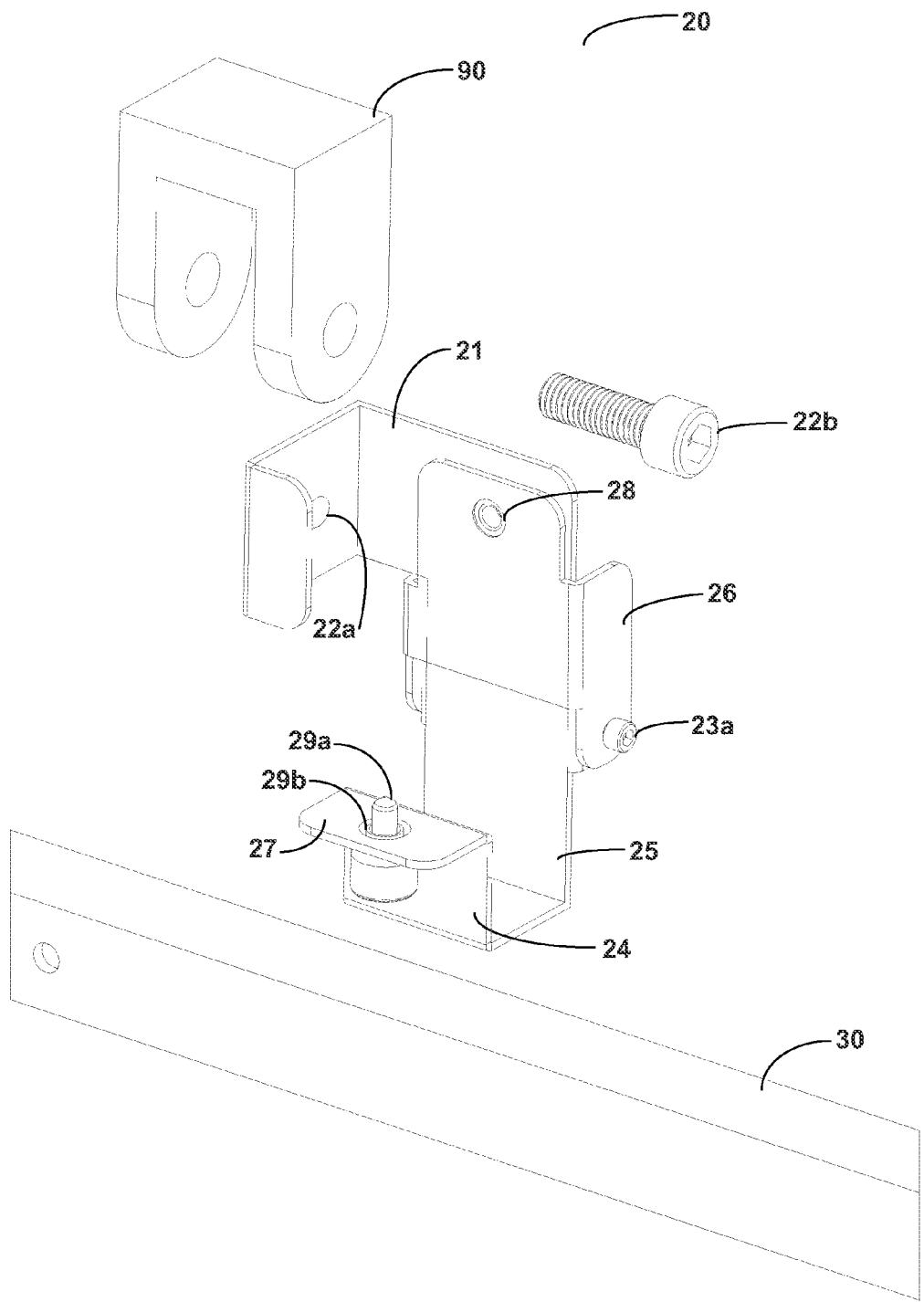
FIG. 2A is an exploded view of an exemplary support bar mounting bracket.

FIG. 2A is an exploded view of supplemental support member 20. In the embodiment shown, supplemental support member 20 has bulkhead engaging member 21. In the exemplary embodiment shown in FIG. 2A, bulkhead engaging member 21 is u-shaped with aperture 22a adapted to receive mounting screw 22b to secure bulkhead engaging member to an aircraft bulkhead "eye" bracket 90. Bulkhead engaging member 21 joins support bar mounting member 25, which in the exemplary embodiment shown is primarily L-shaped with vertical lip 24 adapted to secure support bar 30 on the short leg of L-shaped support bar mounting member 25. Vertical lip 24 contains protuberance 27 with pin 29a adapted to project from aperture 29b. Support bar mounting member 25 also contains pivoting closure 26, which in the exemplary embodiment shown in FIG. 2A is a plate with pivotal connections 23a and 23b (not shown), with aperture 28. Shown in FIG. 2A, pivoting closure 26 is open. To close, pivoting closure 26 pivots at pivotal connections 23a and 23b (not shown) so that aperture 28 aligns with and releasably engages pin 29a to enclose support bar 30.

In still other embodiments, support bar mounting member 22 may contain a sliding compression plate to secure support bar 30 by compressing it against vertical lip 24. In yet further embodiments, support bar mounting member 22 may contain other structures suitable for releasably securing support bar 30, including, but not limited to, adhesives, clips, clasps, locking mechanisms, springs, brackets, screws, pins or combinations of these components.

In the exemplary embodiment shown in FIG. 2A, bulkhead engaging member 21 is specifically adapted to releasably engage an aircraft bulkhead "eye" bracket 90. In further embodiments, bulkhead engaging member 21 may be adapted to releasably engaging other portions of an aircraft bulkhead or any other interior structure of an aircraft able to support supplemental support member 20 and support bar 30. In still further exemplary embodiments, supplemental support member 20 may be permanently attached to a bulkhead "eye" bracket or other internal structure of a cargo aircraft. In yet further embodiments, supplemental support member 20 may be designed for use in aircrafts other than cargo aircrafts, such as passenger jets.

Figure 2B:
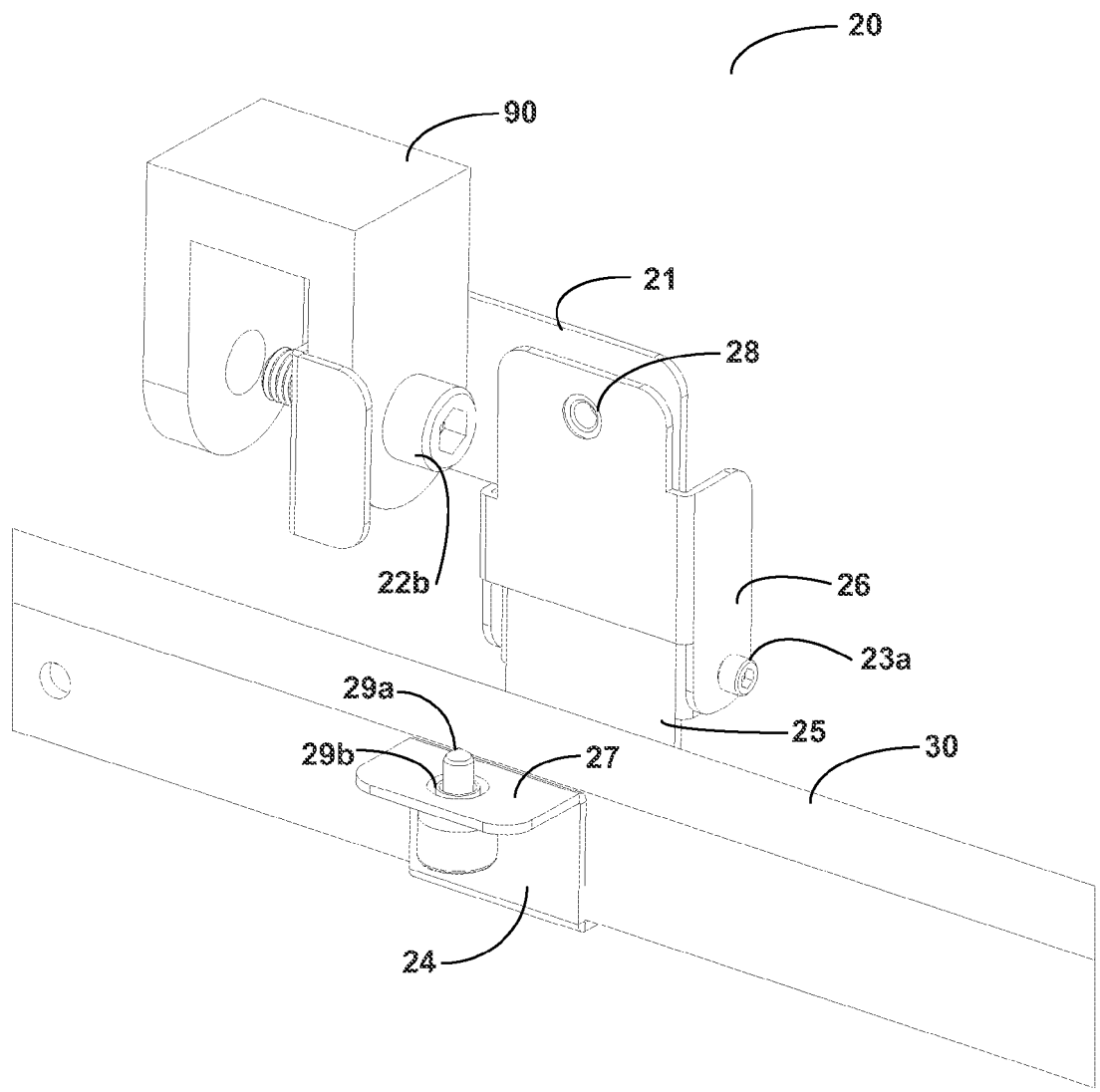
FIG. 2B is an exemplary embodiment of an assembled support bar mounting bracket.

FIG. 2B is an exemplary embodiment of an assembled supplemental support member 20. Bulkhead engaging member 21 is attached to bulkhead "eye" bracket 90, with support bar 30 secured on support bar mounting member 25.

In the exemplary embodiments shown in FIGS. 2A and 2B, supplemental support member 20 is made from pieces of bent sheet metal. In further exemplary embodiments, supplemental support member 20 may be a singly molded piece. In still further exemplary embodiments, supplemental support member 20 may be two or more separately manufactured pieces.

In the exemplary embodiments shown in FIGS. 2A and 2B, supplemental support member 20 contains u-shaped bulkhead engaging member 21 and primarily L-shaped support bar mounting member 25. In further embodiments, supplemental support member 20 may be a brace of any shape, including, but not limited to, u-shaped, c-shaped, L-shaped, curved, angled, or otherwise adapted to provide support when used in conjunction with a stringer engaging component. In still further embodiments, supplemental support member 20 may be a single structure adapted to engage both a supporting structure, such as a bulkhead, and a supported structure, such as a support bar. In yet further exemplary embodiments, supplemental support member 20 may be adapted to support a component other than or in addition to a support bar, including, but not limited to, packages, storage devices, personal equipment, additional area lighting or combinations of these and other components.

Figure 3A:
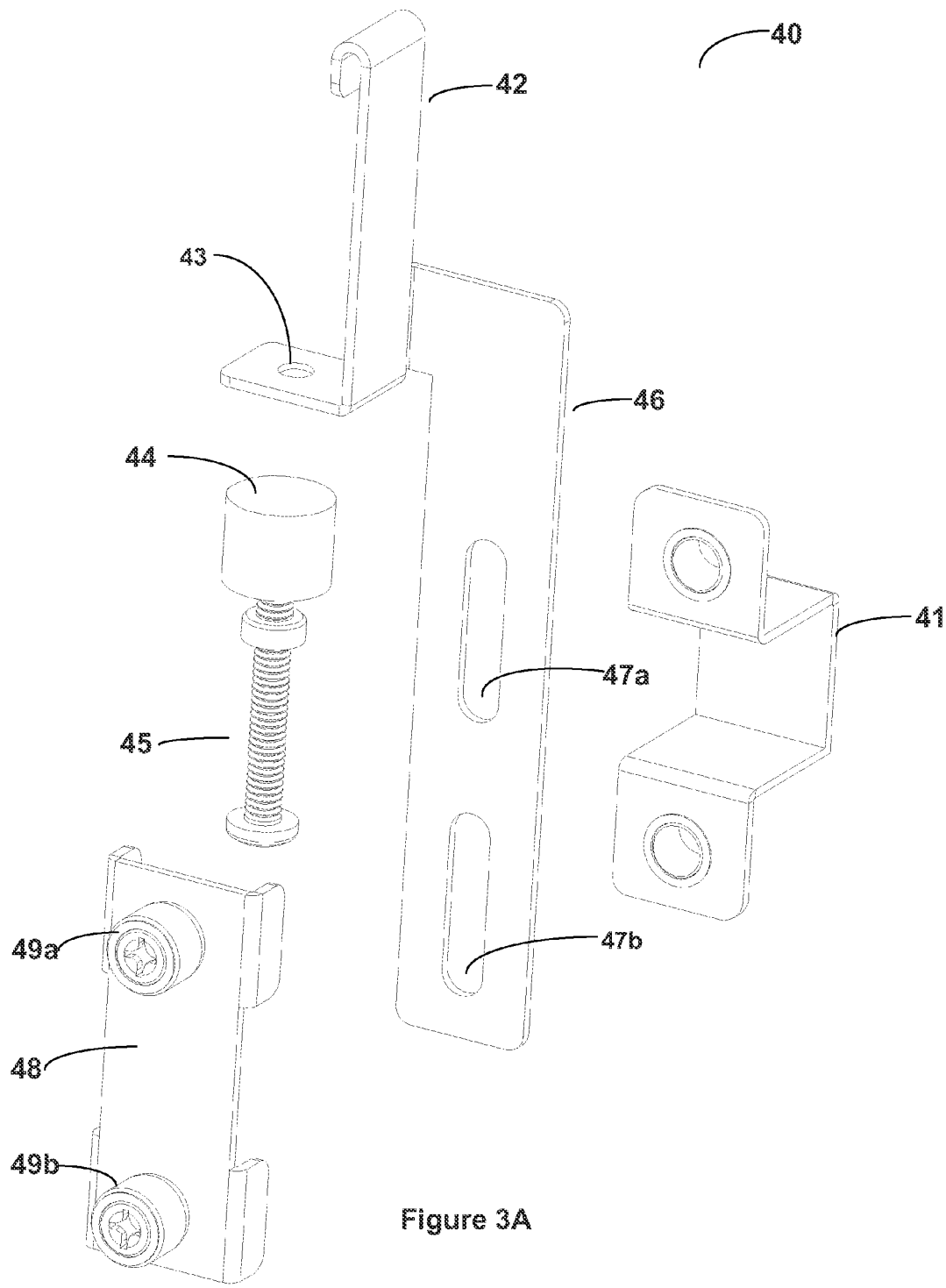
FIG. 3A is an exploded view of an exemplary stringer engaging component.

FIG. 3A is an exploded view of an exemplary stringer engaging component 40. Stringer engaging component 40 affixes to stringer 50 (not shown) through a stringer affixation member that, in the exemplary embodiment shown, includes hook-shaped member 42 with aperture 43 for tightening screw 45. Tightening screw 45, when tightened, applies clamping force to stringer 50 (not shown) in order to secure stringer engaging component 40 to stringer 50 (not shown). Stringer 50 (not shown) is a thin frame member of an aircraft used to support the aircraft's skin and prevent deforming. Tightening screw 45 contains stringer protective pad 44 which prevents damage to stringer 50 (not shown) when stringer engaging component 40 is attached. Stringers 50 (not shown) may be made of deformable material, and the clamping force applied by an unprotected tightening screw 45 may cause damage or deformation to stringer 50 (not shown).

In further exemplary embodiments, stringer engaging component 40 may utilize different stringer affixation members, including clips, clasps, buckles or any other structure adapted to affix stringer engaging component 40 to a stringer.

In the exemplary embodiment shown, stringer engaging component 40 is releasably attached to stringer 50 (not shown) through clamping force applied by tightening screw 45. In still other embodiments, clamping force may be applied by any structure known in the art to apply a clamping force, including bolt assemblies, pinching mechanisms, vices, presses, springs, pneumatic or hydraulic means, or combinations of these and other structures. In the exemplary embodiment shown, clamping force may be applied at varying intensities, depending on how tight tightening screw 45 is tightened. In still other exemplary embodiments, however, clamping force may be applied at a single intensity or may be automatically adjusted to an intensity determined sufficiently strong enough to support a stringer engaging component and its load without damaging a stringer by including a sensor with the clamp assembly.

In the exemplary embodiment shown in FIG. 3A, stringer protective pad 44 is illustrated as a single rubber component. In further exemplary embodiments, stringer protective pad 44 may be made of any material known in the art to prevent damage caused by scratching, scraping or clamping force, including, but not limited to, rubber, cork, silicon, fabric, foam, any other protective material or combinations of materials. Stringer protective pad 44 may also be of different dimensions to provide optimal surface area for applying clamping force to stringer.

Stringer engaging component 40 also contains slotted height-adjusting member comprised of vertical stringer suspension member 46 with slotted apertures 47a and 47b and height adjusting member 48 with securing screws 49a and 49b adapted to engage apertures in stringer bar support member 41. Vertical stringer suspension member 46, attached to the lower end of hook-shaped member 42, contains slotted apertures 47a and 47b. Stringer bar support member 41 supports support bar 30 (not shown), and height adjusting member 48 allows stringer bar support member 41 to be adjusted to accommodate slight variances in stringer height between aircrafts so that support bar 30 (not shown) does not bow or bend. Height adjusting member 48 slides along vertical stringer suspension member 46 to move stringer bar support member 41 higher or lower. Securing screws 49a and 49b slidably move within slotted apertures 47a and 47b and tighten to secure height adjusting member 48, with stringer bar support member 41, at a desired height.

In further exemplary embodiments, height adjusting member 48 may contain more or fewer securing screws, and slotted apertures 47a and 47b may be differently configured to provide additional vertical or horizontal adjustments. In yet further exemplary embodiments, slotted apertures 47a and 47b may be a single aperture. In still further embodiments, stringer engaging component 40 may contain a height-adjusting component other than a slotted height-adjusting member, such as a telescoping component, a sliding component secured by a pin or pins, or any other component known in the art to provide height-adjusting capabilities.

Figure 3B:
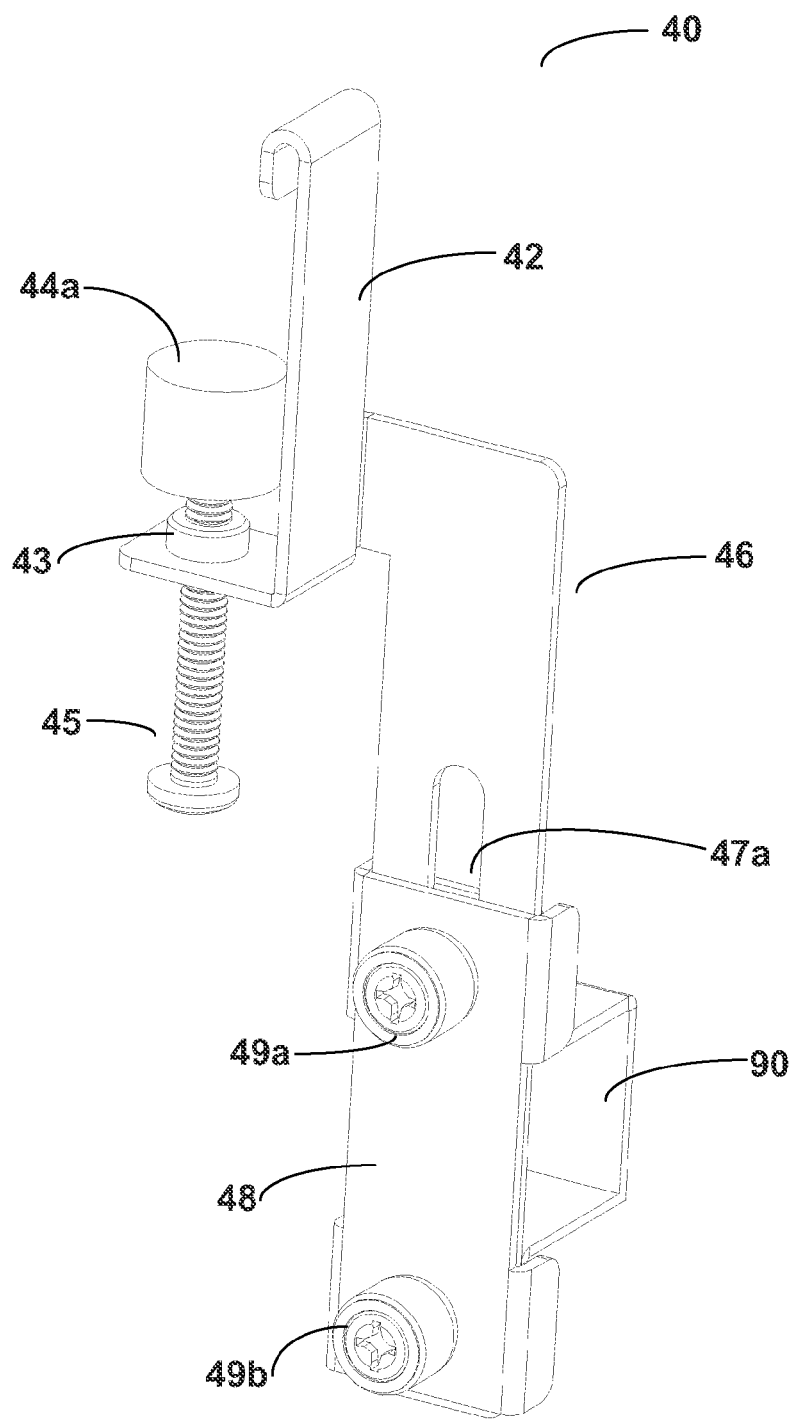
FIG. 3B is an exemplary embodiment of an assembled stringer engaging component.

FIG. 3B is an exemplary embodiment of an assembled stringer engaging component 40. Stringer engaging component 40 is releasably engaged to stringer 50 (not shown), with stringer protective pad 44 creating a cushion between stringer 50 (not shown) and stringer engaging component 40. Hook-shaped member 42 has aperture 43 for tightening screw 45, which in the exemplary embodiment shown in FIG. 3B is tightened. Height adjusting member 48 is adjusted to hold support bar 30 without bowing or bending, and stringer bar support member 41 secures support bar 30 in a suspended position with vertical stringer suspension member 46.

In FIGS. 3A and 3B, stringer bar support member 41 is shown as closed, releasably securing support bar 30. In the exemplary embodiments shown, stringer bar support member 41 is adapted to pivotally open and close to release or secure support bar 30 using an assembly similar to the pivotal connections 23a, 23b and pin 29a of supplemental support member 20. In further exemplary embodiments, stringer bar support member 41 may be adapted with a sliding portion or other hinged mechanism to open and receive support bar 30. In still further embodiments, support bar 30 may not be completely enclosed with stringer bar support member 41. In yet further embodiments, stringer bar support member 41 may include alternative or additional structures for securing support bar 30 to stringer engaging component 40, including, but not limited to, adhesives, clips, clasps, locking mechanisms, springs, brackets, screws, pins or combinations of these components.

In the exemplary embodiments shown in FIGS. 3A and 3B, stringer engaging component 40 is specifically designed to hold the weight of a segment of support bar 30 with mounted light head 60 (not shown). In further embodiments, stringer engaging component 40 may be lightweight to hold less weight or smaller items, or high density to maximize the number of pounds per square inch stringer engaging component 40 may support. Stringer engaging component 40 may also be adapted to hold objects other than or in addition to support bar 30, including, but not limited to, packages, personal equipment, storage devices or even additional area lighting. Vertical stringer suspension member 46, specifically, may be specially adapted to suspend objects other than support bar 30. Vertical stringer suspension member 46 may be of different configurations, shapes or sizes adapted to suspend a component from stringer engaging component 40.

Figure 4A:
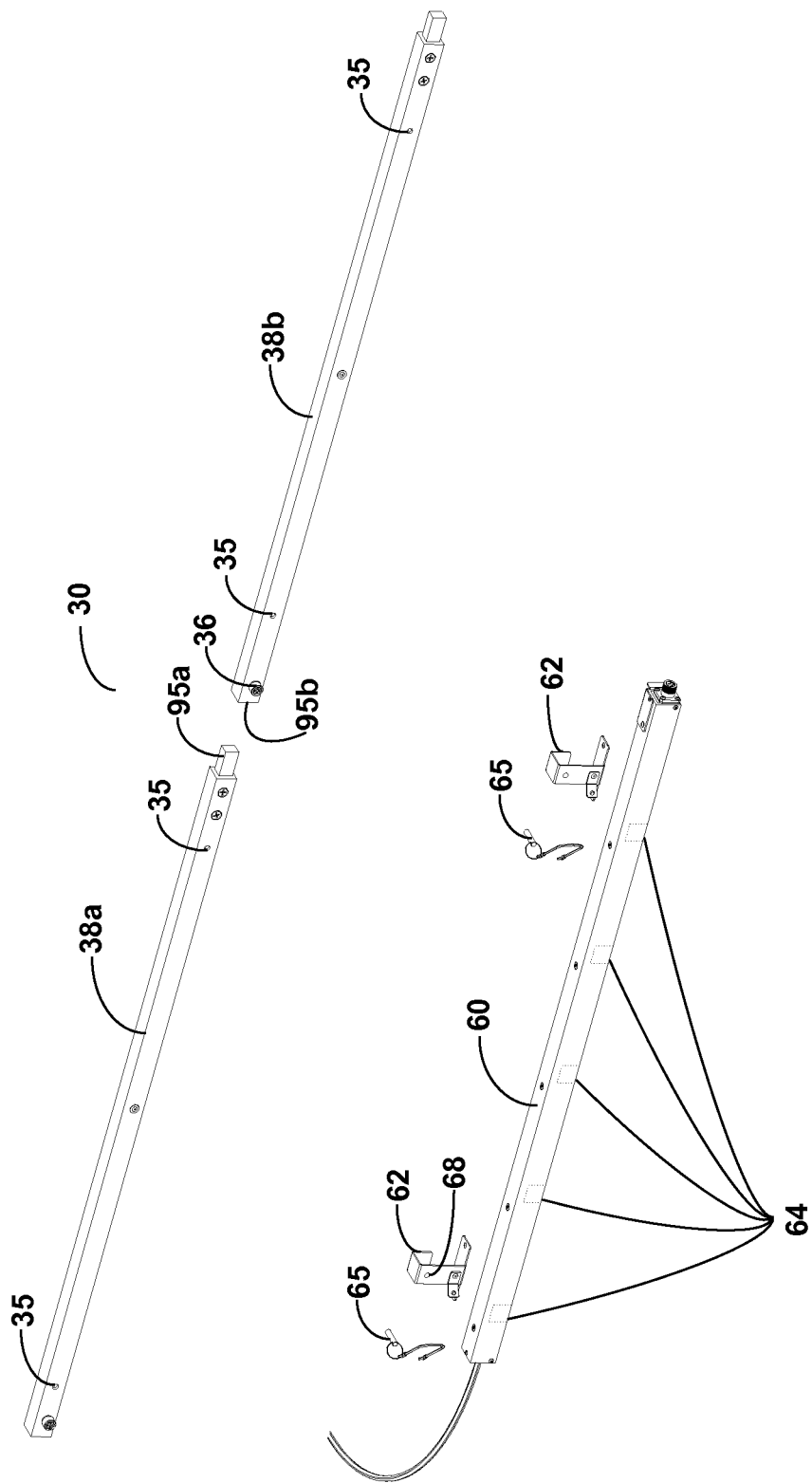
FIG. 4A is an exploded view of an exemplary light mounting bar with lights.

FIG. 4A is an exploded view of an exemplary support bar 30 with light head 60. Support bar 30 is comprised of interlocking segments 38a and 38b. Light head 60 is attached to support bar 30 through light head brackets 62. Light head bracket 62 contain aperture 68, which corresponds to light mounting aperture 35 on support bar 30, and is adapted to receive securing pin 65 to prevent light head 60 from sliding.

In the exemplary embodiment shown in FIG. 4A, light head brackets 62 are brace and pin assemblies created bent pieces of sheet metal bolted to light heads 60 with a removable pin attached to the brace with a flexible chain or wire. In further embodiments, light head brackets 62 may utilize a clip, clasp, interlocking components, springs or any other securing structure adapted to secure a light head to a horizontal bar, or combinations of these components. In still further embodiments, light brackets 62 may be singly molded pieces or a single bent piece of sheet metal. In still further exemplary embodiments, light head brackets 62 may be made from two or more separately manufactured pieces.

In the exemplary embodiment shown, light head 60 is comprised of a series of LED components 64 (not shown), although in further embodiments, light head 60 may contain other light emitting components. When fully assembled, light heads 60 have a color rendering index (CRI) of approximately 90. A CRI of 80-85 is considered acceptable for portable examinations, while operating rooms require a CRI of 100. Lights 60 are also capable of providing 15 foot-candles of light at the floor.

In further embodiments, light heads 60 may contain any light emitting component capable of providing a CRI of at least 80 and sufficient foot-candles of light at the floor, including, but not limited to, incandescent, halogen, fluorescent and high intensity discharge components, any other light emitting components known in the art, including mechanical or chemical lighting components, or combinations of these components.

In the exemplary embodiment shown, LED components 64 (not shown) are linearly arranged. LED components 64 may be offset or grouped, as long as primarily linearly arranged in order to provide an even distribution of light along the length of light head 60. In still further exemplary embodiments, LED components 64 may be strategically located along the length of light head 60 in a pattern specifically designed to provide maximum lighting intensity and distribution.

In the exemplary embodiment shown in FIG. 4A, interlocking segments 38a and 38b contain male end 95a and female end 95b. Interlocking segments 38a and 38b releasably interlock by sliding male end 95a of one interlocking segment 38a into female end 95b of another interlocking segment 38b, and interlocking segments 38a and 38b are then secured by tightening fastener 36. In still other embodiments, interlocking segments 38a and 38b may interlock with tabs, telescoping frames, springs, any other structure known in the art to releasably join two segments and combinations of these structures. In still further embodiments, interlocking segments 38a and 38b may be secured through a structure other than a tightening fastener, such as springs, clasps, buttons, friction-engaged gaskets, telescoping frames, tabs, any other known in the art to secure interlocking members or combinations of such structures. In still further exemplary embodiments, interlocking segments 38a and 38b may be telescoping.

In the embodiment shown in FIG. 4A, interlocking segments 38a and 38b are hollow members made of lightweight metal. In further exemplary embodiments, interlocking segments 38a and 38b may be made of any other material known in the art to provide a stable support for securely mounting light heads, including, but not limited to, wood and plastics. In still further exemplary embodiments, interlocking segments 38a and 38b may be solid, semi-solid, or contain a full or partial core made from the same or a different material than the outer surface of interlocking segments 38a and 38b.

Figure 4B:
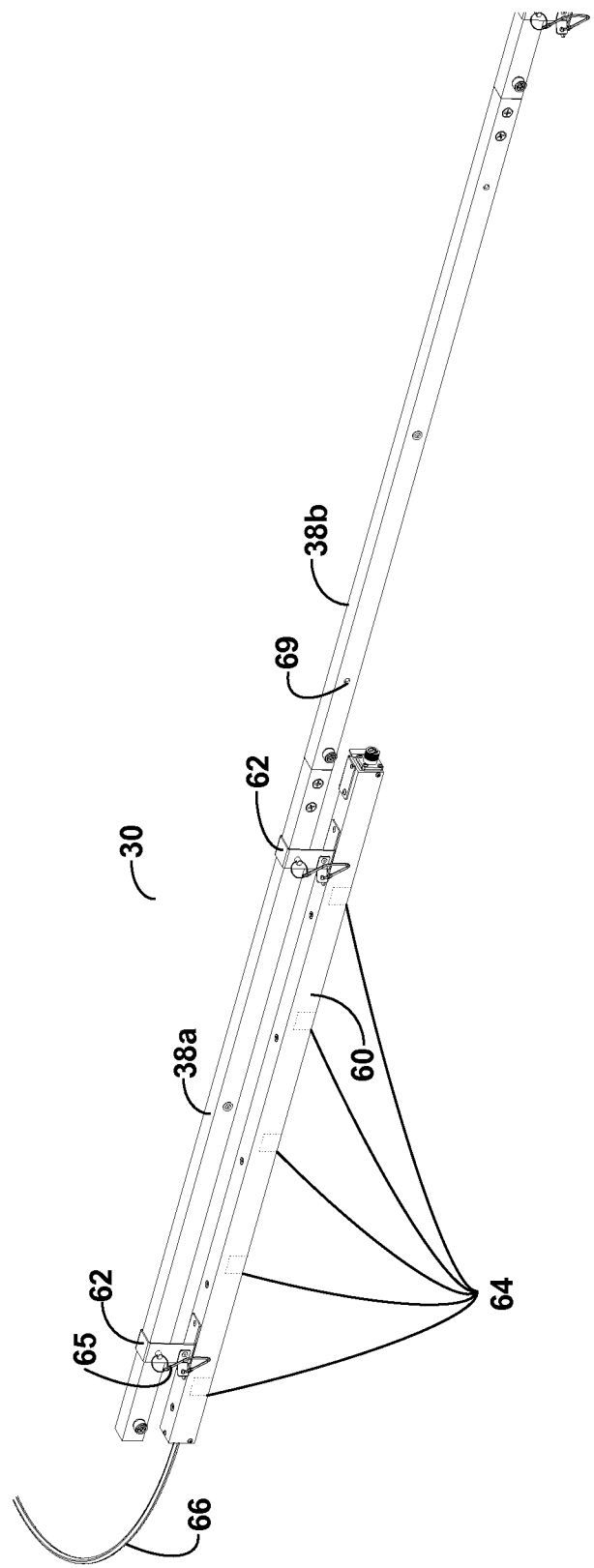
FIG. 4B is an exemplary embodiment of an assembled light mounting bar.

FIG. 4B is an exemplary embodiment of an assembled support bar 30. Light mounting bar contains interlocking segments 38a and 38b. Light head 60 is attached to support bar 30 by light head bracket 62, and securing pin 65 is in place. Light head 60 is mounted such that linearly arranged LED components 64 (not shown) face the ground, and serial cable component 66 serially attaches to the next light in the series.

Assembled support bar 30 may also include station controls (not shown), which includes potentiometers (not shown) adapted to dim or brighten lights. In the exemplary embodiment described in FIGS. 1-8B, light heads 60 are divided into zones, with each zone having an independent station control that allows flight crews to dim or brighten a single zone of light heads 60. This is beneficial for aeromedical evacuations because patients that need rest may have dim lighting, while patients requiring observation or medical attention can still be seen in full lighting. In further exemplary embodiments, station control may control more or fewer light heads, or may be further adapted that passengers or patients may manipulate station control. In still further embodiments, all light heads may be controlled only by a single master control that may include a potentiometer. In still other exemplary embodiments, lighting controls may have a device other than a potentiometer capable of continuously adjusting lighting intensity, such as a variable resistor or silicon-controlled rectifier. In yet further embodiments, station controls or master controls may include a potentiometer or other device capable of continuously adjusting light intensity.

In the exemplary embodiments shown in FIGS. 4A and 4B, support bar 30 is shown as squared segments. In further exemplary embodiments, support bar 30 may be of any size, shape, segmentation or construction able to support another component, including light heads 60. Support bar 30 may be a single structure or of more or fewer segments. As shown in FIGS. 4A and 4B, support bar 30 is made of a lightweight metal, but in further exemplary embodiments, support bar 30 may be made of any material able to support and secure light heads 60 or any other component adapted to be secured by support bar 30.

FIG. 5 illustrates a schematic of where elements of an exemplary cargo plane lighting system may be mounted. In the exemplary schematic shown, support bar is shown in three sections—one shorter section 30a at the cargo door 115, and two longer sections 30b, 30c running the length of the aircraft. In the exemplary embodiment shown in FIG. 5, the shorter section 30a of support bar is created from four interlocking segments 38 (not shown), and each of the longer sections 30b, 30c of support bar are created from nine interlocking segments 38 (not shown). In further exemplary embodiments, support bar 30 may be divided into more or fewer sections, and sections may be created from more or fewer interlocking segments 38.

In the exemplary embodiment shown in FIG. 5, master control box 85 is located opposite cargo door 115, while power source 70 is located between the two longer sections 30b, 30c of support bar 30. In still further exemplary embodiments, master control box 85 and power source 70 may be in different locations depending on the specific flight or crew needs.

In the exemplary embodiment shown in FIG. 5, power source 70 is the aircraft's internal AC power source, and not an external power source. In further embodiments, master control box 85 may include a power source to power light heads 60, or a separate power source may be connected to master control box 85. In the exemplary embodiment shown, power supply 70 is connected to master control box 85 by AC power line 72 (not shown). AC/DC converter 74 (not shown) converts AC power form power source 70, and DC power line 76 (not shown) connects master control box 85 to light heads 60.

Figure 6:
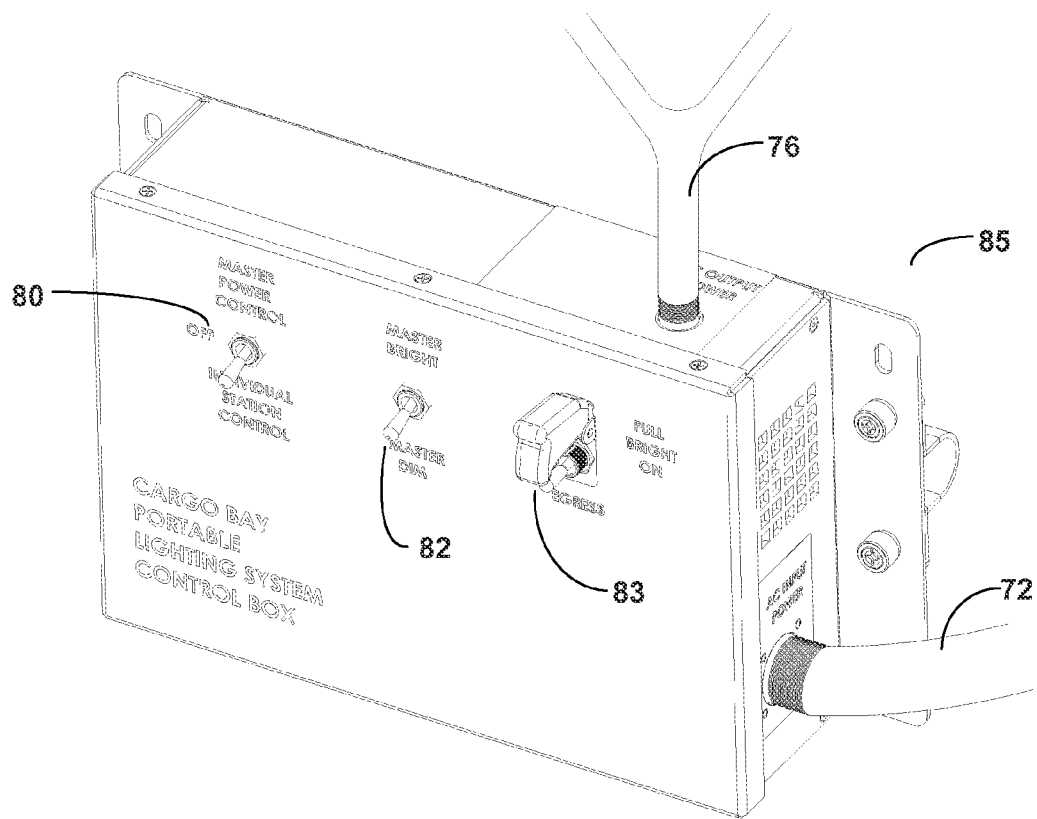
FIG. 6 illustrates an exemplary embodiment of the exterior of a master control box.

FIG. 6 illustrates an exemplary embodiment of the exterior of master control box 85. Master control box 85 contains main power switch 80, which in the embodiment shown allows a user to select whether or not station controls are operational. Master dimmer control 82 dims or brightens all stations, regardless of whether station controls are operational or not. Emergency egress switch 83 instantly brings all light heads to full brightness. In the embodiment shown main power switch 80, master dimmer control 82 and emergency egress switch 83 are all shown as toggle switches. In further embodiments, toggle switches may be any switches known in the art to quickly control power to light heads, including, but not limited to, a knob, push button, a dial or a sliding member. In still further embodiments, toggle switches may be adapted to continuously adjust light intensity, or may be any structure known in the art adapted to provide a continuous adjustment of light intensity including, but not limited to, a sliding mechanism, dial or a digital meter.

In the embodiment shown in FIG. 6, power source 70 (not shown) is connected to master control box 85 by AC power line 72. AC/DC converter 74 (not shown) converts AC power from power source 70 (not shown) into DC power output by DC power line 76, which is a Y-shaped cable, with the split Y-end connected to the two longer sections of support bar 30 (not shown), and the single end connected to master control box 85.

In the exemplary embodiment shown in FIG. 6, master control box 85 was tested according to the DO-160D guidelines established by the Radio Technical Commission for Aeronautics (RTCA) for radiated RF interference, conducted RF interference, explosive environment conditions, vibration and shock. In still further embodiments, master control box 85 may be built to meet more stringent specifications, and may be further modified to meet any specifications required for permanent installation on an aircraft.

Figure 7:
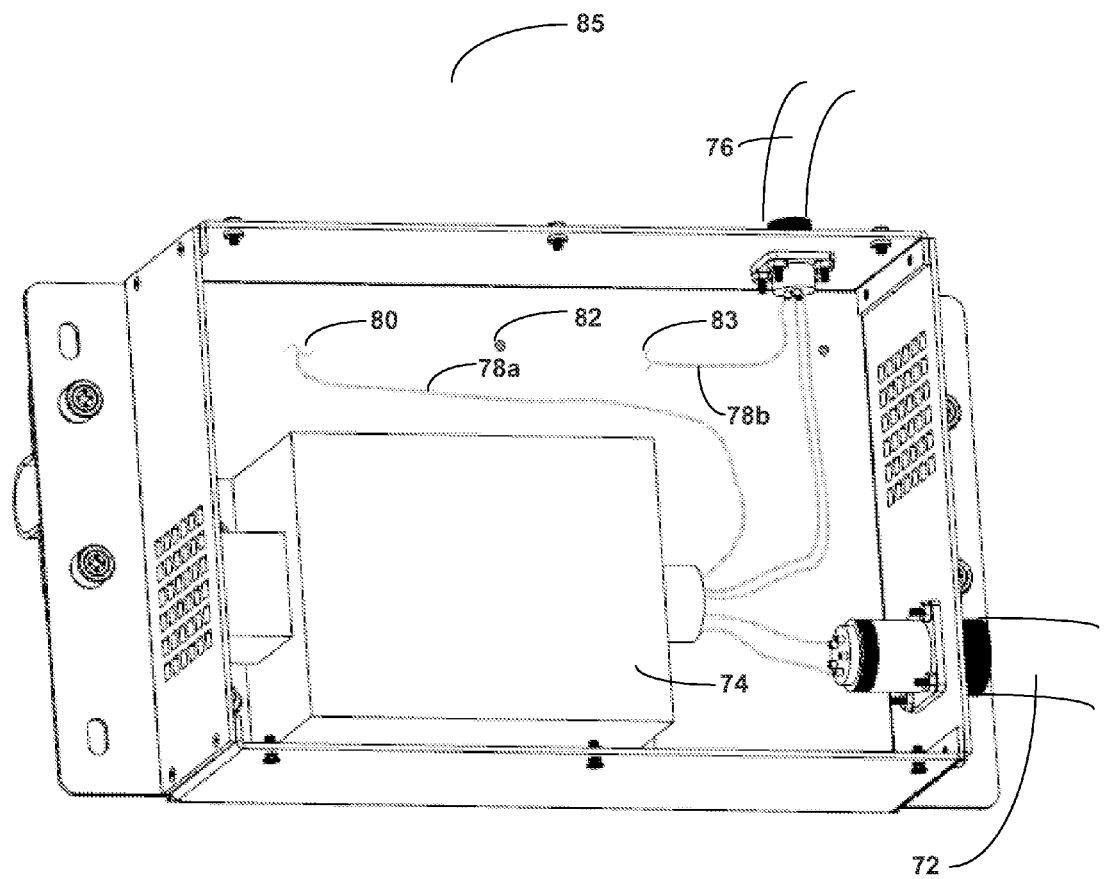
FIG. 7 illustrates an exemplary embodiment of the interior of a master control box.

FIG. 7 illustrates an exemplary embodiment of the interior of master control box 85. Master control box 85 receives 115 V AC/400 Hz input from power source 70 (not shown) connected by AC power line 72. AC/DC converter 74 converts AC input into DC for output by DC power line 76. Also visible in the exemplary embodiment shown in FIG. 7 are toggle switch wires 78a and 78b, which connect main power switch 80, master dimmer control 82 and emergency egress switch 83 to power.

Figure 8A:
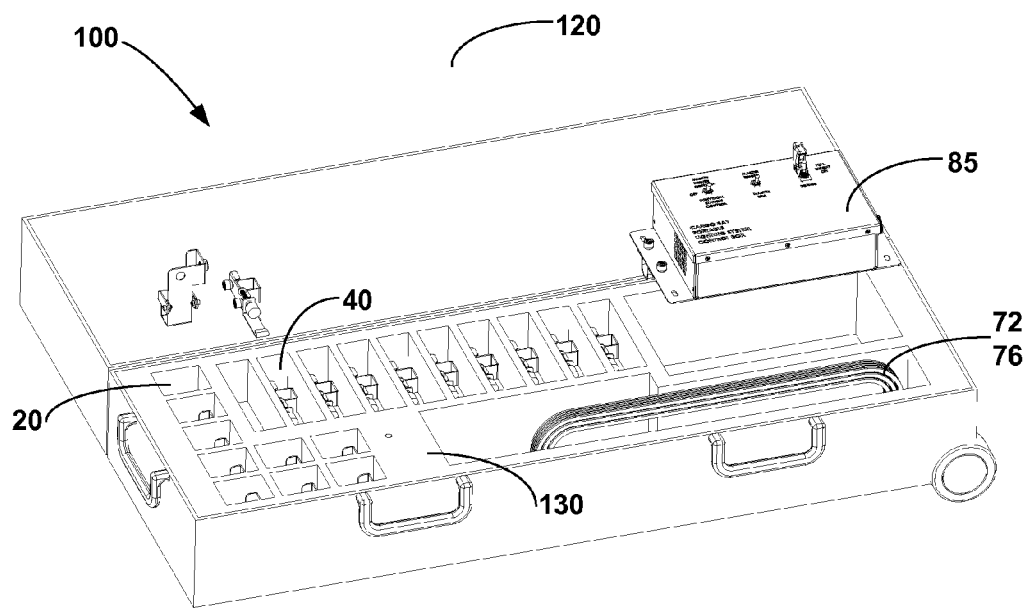
FIG. 8A is an exemplary embodiment of the elements of a cargo plane lighting system disassembled and stored.

FIG. 8A is an exemplary embodiment of cargo plane lighting system 100 disassembled and stored in open cases. In the exemplary embodiment shown in FIG. 8A, cargo plane lighting system 100 is disassembled and adapted to be stored in three cases. First case 120 contains supplementary support members 20, stringer engaging components 40, master control box 85, AC power line 72, DC power line 76, and other tools and components for added support and organization if needed. Other tools and components may include, for example, hook-and-loop fasteners for securing and organizing power cables or Allen wrenches or other tools to aid in quickly installing cargo plane lighting system 100. Second and third cases (not shown) contain light heads 60 (not shown) and interlocking segments 38 (not shown), respectively.

In the exemplary embodiment shown in FIG. 8A, there are 10 supplementary support members 20, 9 stringer engaging components 40, 1 master control box 85, 1 AC power line 72 and 1 DC power line 76 in first case 120. Second and third cases (not shown) contain 12 light heads 60 (not shown) and 22 interlocking segments 38 (not shown), respectively. In further exemplary embodiments, cargo plane lighting system 100 may be disassembled into more or fewer pieces and be divided into more or fewer cases.

Cargo plane lighting system 100, when disassembled and stored in cases, is also protected by shock-absorbing foam material 130 to prevent damage during transport and storage. In still further embodiments, disassembled cargo plane lighting system 100 may be secured in cases with additional straps or other bindings to prevent damage to cargo plane lighting system 100 components during transport and storage.

Figure 8B:
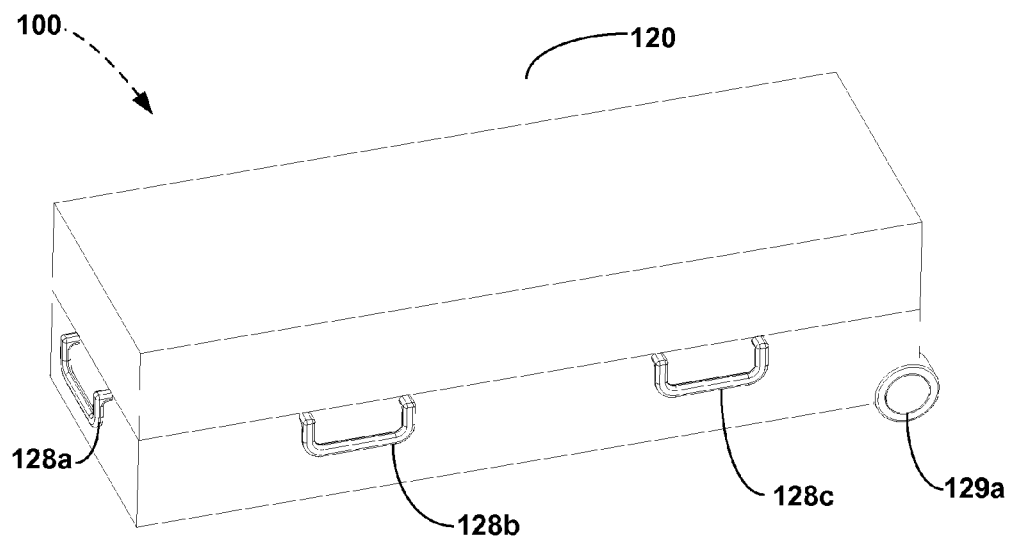
FIG. 8B illustrates the exterior of an exemplary cargo plane lighting system storage device.

FIG. 8B illustrates the exterior of an exemplary cargo plane lighting system 100 storage case 120. Case 120 is specially proportioned to be quickly and easily carried onto and off of a plane. In the exemplary embodiments described, cargo plane lighting system 100 weighs less than 100 pounds divisible between three cases. Each case is easily transported by a single person, and compact for storage. In further embodiments, cargo plane lighting system 100 may be manufactured to weigh less than 100 pounds, and may be adapted to be carried by a single person.

Case 120 has handles 128a, 128b and 128c and wheels 129a and 129b (not shown) to allow case 120 to be easily carried or wheeled. Case 120 is also substantially cubical, with straight parallel sides for easy stacking and storage. The exterior of case 120 is made of a weather resistant, protective material that minimizes damage to cargo plan lighting system 100 components while transported and stored. In further embodiments, case exteriors may include additional cushions or shock absorbing panels. In still further exemplary embodiments, the case exterior may be of other materials known in the art to resist deforming in extreme temperatures and protect internal components of cargo plane lighting system 100 from damage during transporting and storing.

What is claimed is:

1. A cargo lighting system apparatus comprised of:
    a support bar with a plurality of light mounting apertures;
    a plurality of light head brackets;
    a plurality of linearly arranged light emitting components mounted in a plurality of light heads, wherein said plurality of light heads are selectively attached to said support bar through said plurality of light head brackets; and
    at least one stringer engaging component comprised of
        a contoured structure for receiving said support bar, and
        a stringer affixation member adapted to releasably attach said stringer engaging component to a stringer.

2. The apparatus of claim 1 wherein said stringer engaging component is selectively attachable.

3. The apparatus of claim 1 wherein said stringer engaging component is comprised of
    a stringer engaging member,
    a vertical stringer suspension member,
    a slotted height-adjusting member, and
    a stringer support bar member affixed to said slotted height-adjusting member.

4. The apparatus of claim 3 wherein said stringer engaging member is a hookshaped member adapted to engage a stringer using clamping force provided by a bolt assembly.

5. The apparatus of claim 4 wherein said bolt assembly further includes a stringer protective pad.

6. The apparatus of claim 3 wherein said slotted height-adjusting member is comprised of
    a slotted aperture through said vertical stringer member, and
    a height adjusting member slidably attached to said vertical stringer member with at least two securing screws,
    wherein said securing screws project through said slotted aperture so that height adjusting member may vertically slide along said slotted aperture and be secured in a position by tightening said at least two securing screws.

7. The apparatus of claim 1 which further includes at least one supplemental support member comprised of
    a mounting screw adapted to engage a bulkhead,
    a u-shaped bulkhead engaging member with an aperture adapted to receive said mounting screw,
    an L-shaped member with a vertical lip adapted to engage said support bar, and a pivoting closure.

8. The apparatus of claim 7 wherein said at least one supplemental support member is selectively attachable.

9. The apparatus of claim 7 wherein said at least one supplemental support member is formed in two separately manufactured pieces.

10. The apparatus of claim 7 wherein said at least one supplemental support member is singly molded.

11. The apparatus of claim 7 wherein said at least one supplemental support member is formed from bent sheet metal.

12. The apparatus of claim 1 wherein said light head brackets are brace and pin assemblies.

13. The apparatus of claim 1 wherein said light emitting components are selected from the group consisting of LEDs, fluorescent tubes, fluorescent cylinders, halogen bulbs, incandescent bulbs, high intensity discharge lamps and combinations thereof.

14. The apparatus of claim 1 wherein each of said light heads includes a potentiometer.

15. The apparatus of claim 1 wherein said support bar is comprised of a plurality of hollow interlocking segments, each of said hollow interlocking segments containing a male end and a female end with a screw, wherein said male end of one of said interlocking segments slidingly engages said female end of another of said interlocking segments and secures with said screw.

16. The apparatus of claim 1 which further includes a master control box comprising
    an AC power line,
    a DC power line,
    an AC/DC converter,
    a main power switch, and
    an emergency egress switch.

17. A cargo aircraft lighting support apparatus comprised of:
    a stringer affixation member adapted to engage a stringer;
    a vertical stringer suspension member with at least one slotted aperture attached to said stringer affixation member;
    a height adjusting member with at least two securing screws; and
    a stringer support bar member attached to said height adjusting member;
    wherein said at least two securing screws project through said slotted aperture to slidingly attach said height adjusting member to said vertical stringer suspension member so that height adjusting member may slide vertically along vertical stringer suspension member and secure in a position by tightening said securing screws.

18. The apparatus of claim 17 wherein said stringer support bar member is hinged to receive a support bar.

19. The apparatus of claim 17 wherein said stringer affixation member comprises
    a tightening screw with a stringer protective pad; and
    a hook-shaped stringer engagement member with an aperture adapted to receive said tightening screw;
    wherein said stringer affixation member releasably attaches to a stringer by clamping force provided by tightening screw pressing against said stringer.

20. A method of installing a cargo plane lighting system comprising the steps of:
    installing support bar mounting brackets onto aircraft bulkhead eye brackets;
    loosening self-contained fasteners on said support bar mounting brackets;
    sliding said support bar mounting brackets open;
    assembling light mounting bar members;

placing said assembled light mounting bar members onto said support bar mounting brackets;

securing said assembled light mounting bar members in said support bar mounting brackets by tightening said self-contained fasteners;

adjusting said support bar mounting brackets so that said light mounting bar members are parallel to the floor;

securing said light mounting bars with a plurality of stringer engaging components;

mounting lights on said secured lighting mounting bar members;

connecting wiring between said lights so that said lights are connected in two groups;

installing a master control box;

connecting a DC output power line to said two groups of lights and said master control box; and connecting an AC power input cable to said master control box and an aircraft power receptacle.

\* \* \* \* \*